United States Patent
Miles et al.

(10) Patent No.: US 11,349,911 B1
(45) Date of Patent: May 31, 2022

(54) MACHINE LEARNING-BASED DEPLOYMENT OF GUARDRAIL POLICIES

(71) Applicant: AT&T Intellectual Property I, L.P., Atlanta, GA (US)

(72) Inventors: Brian Miles, Pittsboro, IN (US); Chad Hiestand, Winfield, IL (US); Anthony Librera, Palm Harbor, FL (US); William Trost, Mequon, WI (US)

(73) Assignee: AT&T Intellectual Property I, L.P., Atlanta, GA (US)

( * ) Notice: Subject to any disclaimer, the term of this patent is extended or adjusted under 35 U.S.C. 154(b) by 0 days.

(21) Appl. No.: 17/230,150

(22) Filed: Apr. 14, 2021

(51) Int. Cl.
| | |
|---|---|
| *H04L 12/24* | (2006.01) |
| *H04L 67/101* | (2022.01) |
| *G06N 20/00* | (2019.01) |
| *H04L 41/16* | (2022.01) |
| *H04L 67/1029* | (2022.01) |

(52) U.S. Cl.
CPC .......... *H04L 67/101* (2013.01); *G06N 20/00* (2019.01); *H04L 41/16* (2013.01); *H04L 67/1029* (2013.01)

(58) Field of Classification Search
None
See application file for complete search history.

(56) References Cited

U.S. PATENT DOCUMENTS

| | | | |
|---|---|---|---|
| 2015/0269383 A1* | 9/2015 | Lang | H04L 63/20 726/1 |
| 2017/0034023 A1* | 2/2017 | Nickolov | H04L 43/0817 |
| 2019/0327271 A1* | 10/2019 | Saxena | G06N 3/0454 |
| 2020/0287793 A1* | 9/2020 | Buck | H04L 41/0893 |

* cited by examiner

*Primary Examiner* — Natisha D Cox
(74) *Attorney, Agent, or Firm* — Hartman & Citrin LLC (57) ABSTRACT

A system can receive a guardrail policy request that specifies a guardrail policy to assess for deployment on a server to protect at least a specific port of the server. The system can execute a fingerprint clustering machine learning model using server fingerprint data to generate cluster data that identifies a virtual machine cluster that includes a plurality of virtual machines executed by the server. The system can execute a traffic discovery machine learning model using server traffic data and the cluster data to generate a confidence score indicative of whether deployment of the guardrail policy would have an adverse impact on the server. The system can execute a risk assessment machine learning model using the application type data to generate a risk assessment score. The system can evaluate the confidence score and the risk assessment score and can determine whether the guardrail policy should be deployed on the server.

20 Claims, 7 Drawing Sheets

MACHINE LEARNING-BASED DEPLOYMENT OF GUARDRAIL POLICIES

BACKGROUND

Cloud computing allows dynamically scalable virtualized resources to host applications and services. Cloud computing assures an appropriate level of resources are available to power software applications when and where the resources are needed in response to demand. As a result, cloud computing allows entities to respond quickly, efficiently, and in an automated fashion to rapidly changing business environments.

Presently, the time needed to deploy a cloud-based virtual machine is a few minutes, and that time continues to decrease as computing power increases. With this pace, virtual machines can be deployed quickly and potentially without implementing certain security measures. For example, there are often overlooked and unused ports on virtual machines and this poses an unnecessary cybersecurity risk to a vast array of businesses. One of the key issues is that with the rapid proliferation of third-party cloud services, it is relatively easy and inexpensive to deploy virtual machines. This fact has only exacerbated the need to have intelligent security controls as cloud services can provide a wide variety of functionality. There are risks involved with applying automated firewall policies (also known as "guardrails"). Moreover, any machine learning efforts to solve this problem must factor in the inherent risk.

SUMMARY

Concepts and technologies disclosed herein are directed to machine learning-based deployment of guardrail policies. The disclosed solution utilizes three machine learning models. A first machine learning model identifies clusters based upon server "fingerprint" data and is referred to herein as a fingerprint clustering model ("FCM"). This fingerprint is based on canonical information (e.g., software packages, common vulnerabilities and exposures ("CVEs"), workflow details, and the like) from each server.

Combining the clustered fingerprint data with traffic flow details, the disclosed solution then uses a specialized neural network to analyze network traffic information in order to assess the potential impact a given guardrail would have on the virtual machines within a given cluster. This machine learning model is referred to herein as a traffic discovery model ("TDM"). Unique instances of this model can be trained for each cluster, and then the trained models can be used to determine whether a guardrail policy applied against a specific port would have an adverse impact on a respective server. The output from TDM is a confidence score. The closer the confidence score is to one, the more confident the TDM is that deployment of the guardrail policy will not have an adverse impact. Likewise, as the TDM output asymptotically approaches zero, the TDM output indicates that a guardrail policy applied for that specific IP address/port combination would most likely cause an adverse impact on valid traffic.

The third machine learning model is a risk assessment model ("RAM"). This RAM generates a risk assessment score based on application type data relevant to each server. For example, a production, mission critical application will have a higher risk score than a development, non-mission critical application. The fingerprinted cluster data, the confidence scores, and the risk assessment scores can be combined to derive automated guardrail policy orchestration.

By applying intelligent guardrails, the disclosed solution can minimize many cybersecurity risks. This solution can deploy a vast number of guardrail policies that would simply be insurmountable by a human. It also provides automated guardrail policy deployment that utilizes acceptable risk thresholds. These risk thresholds are determined by factoring in confidence scores and risk assessment scores. Finally, this solution significantly reduces security risks by (1) removing access to unnecessary IP ports; (2) eliminating the need to manually apply guardrail policies; and (3) intelligently using automation to block traffic to certain IP ports.

According to one aspect of the concepts and technologies disclosed herein, a guardrail policy system can include a processor and a memory. The memory can have instructions stored thereon that, when executed by the processor, cause the processor to perform operations. In particular, the guardrail policy system can receive a guardrail policy request that specifies a guardrail policy to assess for deployment on a server. The server can include a plurality of ports. The guardrail policy can be used to protect at least a specific port of the plurality of ports. The guardrail policy system can acquire server fingerprint data, server traffic data, and application type data associated with the server. The server fingerprint data can identify the virtual machine cluster based upon canonical information from each of the plurality of virtual machines. The guardrail policy system can execute a fingerprint clustering machine learning model using the server fingerprint data to generate cluster data that identifies a virtual machine cluster that includes a plurality of virtual machines executed by the server. The guardrail policy system can execute a traffic discovery machine learning model using the server traffic data and the cluster data to generate a confidence score indicative of whether deployment of the guardrail policy on the server would have an adverse impact on the server. The guardrail policy system can execute a risk assessment machine learning model using the application type data to generate a risk assessment score. The guardrail policy system can evaluate the confidence score and the risk assessment score. The guardrail policy system can determine, based upon evaluating the confidence score and the risk assessment score, whether the guardrail policy should be deployed on the server.

In some embodiments, a machine learning system can train the fingerprint clustering machine learning model, the traffic discovery machine learning model, and the risk assessment machine learning model. In some embodiments, the machine learning system can train a unique instance of the traffic discovery machine learning specifically for the virtual machine cluster.

As the confidence score approaches one, the traffic discovery machine learning model can be more confident that the guardrail policy will not have the adverse impact on the server. As such, the guardrail policy system can determine that the guardrail policy should be deployed on the server. As the confidence score approaches zero, the traffic discovery machine learning model can be less confident that the guardrail policy will not have the adverse impact on the server. As such, the guardrail policy system can determine that the guardrail policy should not be deployed on the server.

It should be appreciated that the above-described subject matter may be implemented as a computer-controlled apparatus, a computer process, a computing system, or as an article of manufacture such as a computer-readable storage medium. These and various other features will be apparent from a reading of the following Detailed Description and a review of the associated drawings.

This Summary is provided to introduce a selection of concepts in a simplified form that are further described below in the Detailed Description. This Summary is not intended to identify key features or essential features of the claimed subject matter, nor is it intended that this Summary be used to limit the scope of the claimed subject matter. Furthermore, the claimed subject matter is not limited to implementations that solve any or all disadvantages noted in any part of this disclosure.

DETAILED DESCRIPTION

While the subject matter described herein may be presented, at times, in the general context of program modules that execute in conjunction with the execution of an operating system and application programs on a computer system, those skilled in the art will recognize that other implementations may be performed in combination with other types of program modules. Generally, program modules include routines, programs, components, data structures, computer-executable instructions, and/or other types of structures that perform particular tasks or implement particular abstract data types. Moreover, those skilled in the art will appreciate that the subject matter described herein may be practiced with other computer systems, including handheld devices, mobile devices, wireless devices, multiprocessor systems, distributed computing systems, microprocessor-based or programmable consumer electronics, minicomputers, mainframe computers, routers, switches, other computing devices described herein, and the like.

Figure 1:
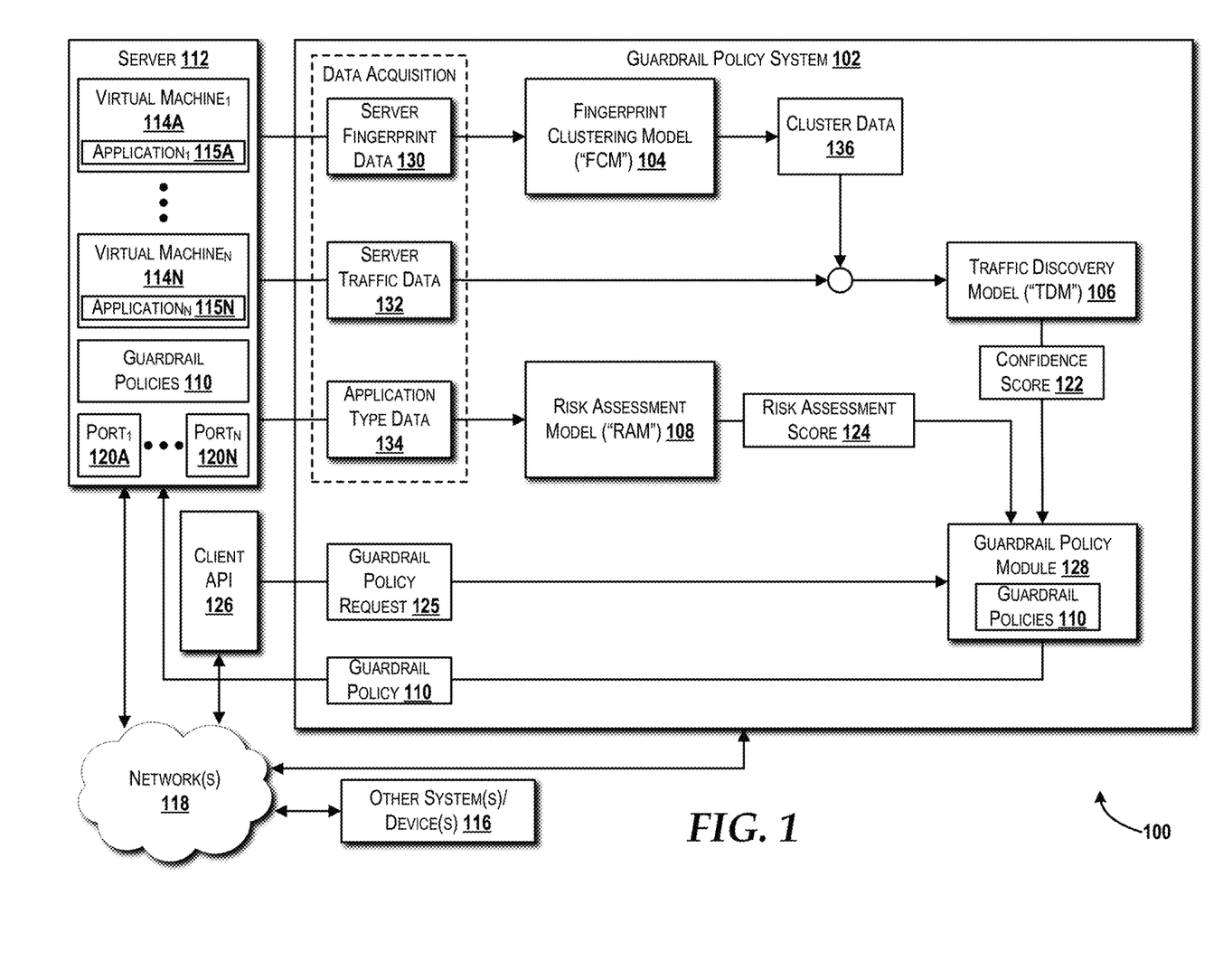
FIG. 1 is a block diagram of an operating environment in which aspects of the concepts and technologies disclosed herein can be implemented, according to an illustrative embodiment.

Turning now to FIG. 1, a block diagram illustrating an operating environment 100 in which aspects of the concepts and technologies disclosed herein can be implemented will be described, according to an illustrative embodiment. The operating environment 100 includes a guardrail policy system 102 that is configured to execute a fingerprint clustering model ("FCM") 104, a traffic discovery model ("TDM") 106, and a risk assessment model ("RAM") 108 to determine whether one or more guardrail policies 110 (hereinafter referred to collectively as "guardrail policies 110" or individually as "guardrail policy 110") should be deployed on a server 112. The guardrail policy system 102 and/or the server 112 can be implemented, at least in part, in one or more computer systems, such as an example computer system 300 that is illustrated and described with reference to FIG. 3. The guardrail policy system 102 and/or the server 112 can be implemented, at least in part, in a virtualized cloud architecture, such as an example virtualized cloud architecture 400 that is illustrated and described herein with reference to FIG. 4. The guardrail policy system 102 and/or the server 112 alternatively can be implemented, at least in part, in a containerized architecture, such as an example containerized cloud architecture 500 that is illustrated and described herein with reference to FIG. 5. Moreover, aspects of the guardrail policy system 102 can be implemented, at least in part, through the use of machine learning technologies, such as via an example machine learning system 600 that is illustrated and described herein with reference to FIG. 6. In particular, the machine learning system 600 can be used to train and execute the FCM 104, the TDM 106, and the RAM 108. The machine learning system 600 can be implemented as part of the guardrail policy system 102 or separate from the guardrail policy system 102. For example, the machine learning system 600 can train the FCM 104, the TDM 106, and the RAM 108, and the guardrail policy system 102 can execute the FCM 104, the TDM 106, and the RAM 108. Those skilled in the art will appreciate that the guardrail policy system 102 and the server 112 can be deployed in various ways on different architectures based upon the needs of a given implementation. Accordingly, the examples set forth herein should not be construed as being limiting to the manner in which the guardrail policy system 102 and the server 112 are implemented.

The server 112 can be a physical server (also known as a bare metal server) that can execute, via one or more hardware processors (best shown as a processing unit 302 in FIG. 3, compute resource(s) 410 in FIG. 4, and host hardware 506A, 506B in FIG. 5), one or more virtual machines 114A-114N (hereinafter referred to collectively as "virtual machines 114" or individually as "virtual machine 114") that, in turn, can each execute one or more applications 115A-115N (hereinafter referred to collectively as "applications 115" or individually as "application 115"). Although the illustrated example shows one server 112 executing two virtual machines 114 that, in turn, each execute one application 115, this example should not be construed as being limiting in any way.

At least a portion of the virtual machines 114 can be clustered together and can communicate with each other, in some implementations, via one or more virtual networks (not shown). The virtual machines 114 can communicate with one or more other systems/devices 116 via one or more networks 118 (e.g., best shown and described with reference to FIG. 7). These communications can be facilitated, at least in part, through one or more ports 120A-120N (hereinafter referred to collectively as "ports 120" or individually as "port 120"), such as one or more well-known ports assigned by the Internet Assigned Numbers Authority ("IANA") designated for use with a specific protocol (e.g., FTP, HTTP, HTTPS, etc.), one or more private ports, one or more virtual ports, and/or one or more ephemeral ports.

The guardrail policies 110 can be used to control access to the ports 120. The guardrail policies 110 can include firewall policies, although other policies are contemplated. The guardrail policy system 102 can determine which of the guardrail policies 110 should be deployed on the server 112, and in doing so, can minimize cybersecurity risks. Moreover, the guardrail policy system 102 can deploy a vast number of the guardrail policies 110 in a fast and more efficient manner than a human. The guardrail policy system 102 can utilize acceptable risk thresholds that are determined by factoring in a confidence score 122 and a risk assessment score 124, as will be described herein below. The guardrail policy system 102 therefore can reduce security risks by removing access to unnecessary ports 120, eliminating the need for a human to manually apply the guardrail policies 110, and utilizing automation to block traffic to certain ports 120. In some embodiments, the guardrail policy system 102 can automatically apply the guardrail policies 110. In some other embodiments, a user (not shown) may desire to deploy a specific guardrail policy 110. The user can submit a guardrail policy request 125 via a client application programming interface ("API") 126. The guardrail policy system 102 can execute a guardrail policy module 128 to receive the guardrail policy request 125, parse the guardrail policy request 125 to determine the guardrail policy 110 requested for deployment, and execute the FCM 104, the TDM 106, and the RAM 108 to determine whether or not the guardrail policy 110 should be deployed on the server 112.

The server 112 can be associated with server fingerprint data 130, server traffic data 132, and application type data 134. The server fingerprint data 130 can include canonical information from each of the virtual machines 114 executed by the server 112. In particular, the server fingerprint data 130 can include data such as one or more software packages (including the applications 115) deployed on the virtual machines 114, one or more common vulnerabilities and exposures ("CVEs") known about the software package(s), workflow details, and other information that can be used to identify the functionality of the server 112 or individual virtual machines 114 executed by the server 112. The server traffic data 132 can include any data received by and sent from the server 112, or particularly the virtual machines 114, via one or more of the ports 120. The application type data 134 can identify the application(s) 115. For example, the application type data 134 can identify whether an application 115 is a production, mission critical application or a development, non-mission critical application.

The guardrail policy system 102 can acquire the server fingerprint data 130 from the server 112 and provide the server fingerprint data 130 to the FCM 104. The FCM 104 can identify clusters of the virtual machines 114 based upon the server fingerprint data 130.

The guardrail policy system 102 also can acquire the server traffic data 132 from the server 112. The guardrail policy system 102 can combine the server traffic data 132 with cluster data 136 that identifies a virtual machine cluster of two or more of the virtual machines 114 executed by the server 112. The server traffic data 132 and the cluster data 136 can then be provided as input to the TDM 106. The TDM 106 can analyze the server traffic data 132 and the cluster data 136 to assess the potential impact that a given guardrail policy 110 would have on the virtual machines 114 within a given cluster. In some embodiments, unique instances of the TDM 106 can be trained for each cluster. The output from the TDM 106 is a confidence score 122. The closer the confidence score 122 is to one, the more confident the TDM 106 is that deployment of the given guardrail policy 110 will not have an adverse impact on the security of the server 112. Likewise, as the confidence score 122 asymptotically approaches zero, this indicates that the given guardrail policy 110 would most likely cause an adverse impact on valid traffic.

The guardrail policy system 102 also can acquire the application type data 134 from the server 112 and provide the application type data 134 to the RAM 108. The RAM 108 can generate the risk assessment score 124 based upon the application type data 134. For example, a production, mission critical application may have a higher risk score than a development, non-mission critical application. The server fingerprint data 130, the confidence score 122, and the risk assessment score 124 can be combined by the guardrail policy module 128 to determine whether or not the given guardrail policy 110 should be deployed on the server 112.

Figure 2:
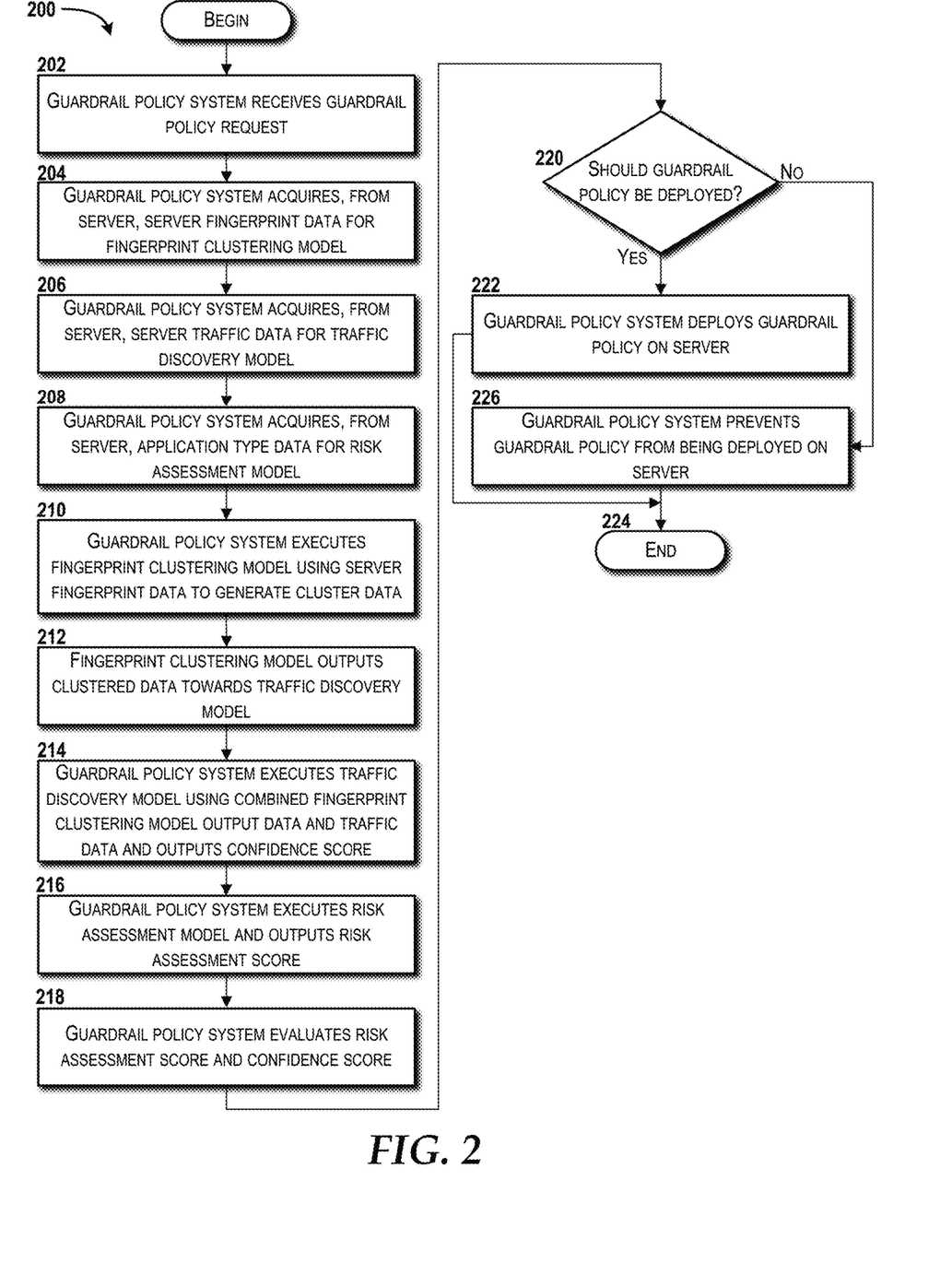
FIG. 2 is a flow diagram illustrating aspects of a method for machine learning-based deployment of one or more guardrail policies on a server, according to an illustrative embodiment of the concepts and technologies disclosed herein.

Turning now to FIG. 2, aspects of a method 200 for machine learning-based deployment of one or more of the guardrail policies 110 will be described, according to an illustrative embodiment of the concepts and technologies disclosed herein. It should be understood that the operations of the method 200 are not necessarily presented in any particular order and that performance of some or all of the operations in an alternative order(s) is possible and is contemplated. The operations have been presented in the demonstrated order for ease of description and illustration. Operations may be added, omitted, and/or performed simultaneously, without departing from the scope of the concepts and technologies disclosed herein. It also should be understood that the methods disclosed herein can be ended at any time and need not be performed in its entirety. Some or all operations of the method 200, and/or substantially equivalent operations, can be performed by execution of computer-readable instructions included on a computer storage media, as defined herein. The term "computer-readable instructions," and variants thereof, as used herein, is used expansively to include routines, applications, application modules, program modules, programs, components, data structures, algorithms, and the like. Computer-readable instructions can be implemented on various system configurations including single-processor or multiprocessor systems, minicomputers, mainframe computers, personal computers, hand-held computing devices, microprocessor-based, programmable consumer electronics, servers, routers, switches, combinations thereof, and the like.

Thus, it should be appreciated that the logical operations described herein are implemented (1) as a sequence of computer implemented acts or program modules running on a computing system and/or (2) as interconnected machine logic circuits or circuit modules within the computing system. The implementation is a matter of choice dependent on the performance and other requirements of the computing system. Accordingly, the logical operations described herein are referred to variously as states, operations, structural devices, acts, or modules. These states, operations, structural devices, acts, and modules may be implemented in software, in firmware, in special purpose digital logic, and any combination thereof. As used herein, the phrase "cause a processor to perform operations" and variants thereof is used to refer to causing a processor or other processing component (s) disclosed herein to perform operations. It should be understood that the performance of one or more operations may include operations executed by one or more virtual processors at the instructions of one or more of the aforementioned hardware processors.

The method 200 begins and proceeds to operation 202. At operation 202, the guardrail policy system 102 receives, via the guardrail policy module 128, the guardrail policy request 125. The guardrail policy request 125 can be received via the client API 126. For example, a user (e.g., an IT administrator) can submit the guardrail policy request 125 that specifies one or more of the guardrail policies 110 for deployment on the server 112. Alternatively, the guardrail policy system 102 can automatically determine one or more of the guardrail policies 110 to be deployed on the server 112.

From operation 202, the method 200 proceeds to operation 204. At operation 204, the guardrail policy system 102 acquires, from the server 112, the server fingerprint data 130 for the FCM 104. From operation 204, the method 200 proceeds to operation 206. At operation 206, the guardrail policy system 102 acquires, from the server 112, the server traffic data 132 for the TDM 106. From operation 206, the method 200 proceeds to operation 208. At operation 208, the guardrail policy system 102 acquires, from the server 112, the application type data 134. The data acquisition operations 204, 206, 208 can be performed simultaneously, in the order described, or in any other order.

From operation 208, the method 200 proceeds to operation 210. At operation 210, the guardrail policy system 102 executes the FCM 104 using the server fingerprint data 130 to generate the cluster data 136. From operation 210, the method 200 proceeds to operation 212. At operation 212, the FCM 104 outputs the cluster data 136 towards the TDM 106. From operation 212, the method 200 proceeds to operation 214. At operation 214, the guardrail policy system 102 executes the TDM 106 using the cluster data 136 and the server traffic data 132 and outputs the confidence score 122.

From operation 214, the method 200 proceeds to operation 216. At operation 216, the guardrail policy system 102 executes the RAM 108 using the application type data 134 and outputs the risk assessment score 124. From operation 216, the method 200 proceeds to operation 218. At operation 218, the guardrail policy system 102 evaluates the confidence score 122 and the risk assessment score 124. From operation 218, the method 200 proceeds to operation 220. At operation 220, the guardrail policy system 102 determines if, based upon the evaluation of the confidence score 122 and the risk assessment score 124, the guardrail policy 110 should be deployed on the server 112. If the guardrail policy system 102 determines that the guardrail policy 110 should be deployed on the server 112, the method 200 proceeds to operation 222. At operation 222, the guardrail policy system 102 deploys the guardrail policy 110 on the server 112. From operation 222, the method 200 proceeds to operation 224. The method 200 can end at operation 224. If the guardrail policy system 102 instead determines that the guardrail policy 110 should not be deployed, the method 200 proceeds to operation 226. At operation 226, the guardrail policy system 102 prevents the guardrail policy 110 from being deployed on the server 112. From operation 226, the method 200 proceeds to operation 224. The method 200 can end at operation 224.

Figure 3:
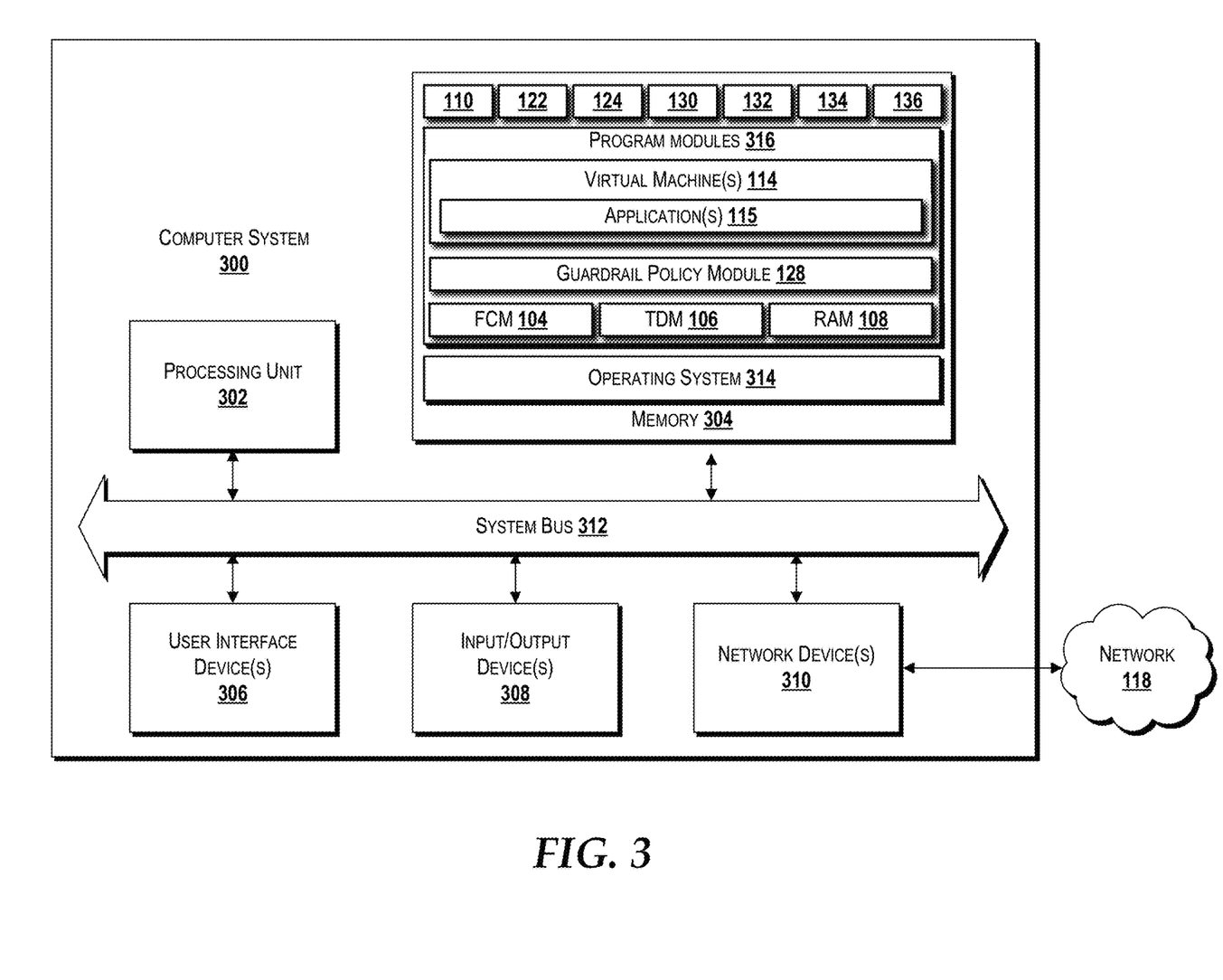
FIG. 3 is a block diagram illustrating an example computer system capable of implementing aspects of the embodiments presented herein.

Turning now to FIG. 3, a block diagram illustrating a computer system 300 configured to provide the functionality described herein in accordance with various embodiments. In some embodiments, the guardrail policy system 102 is configured the same as or similar to the computer system 300. In some embodiments, the server 112 is configured the same as or similar to the computer system 300. In some embodiments, the other system(s)/device(s) 116 is/are configured the same as or similar to the computer system 300. The computer system 300 includes a processing unit 302, a memory 304, one or more user interface devices 306, one or more input/output ("I/O") devices 308, and one or more network devices 310, each of which is operatively connected to a system bus 312. The bus 312 enables bi-directional communication between the processing unit 302, the memory 304, the user interface devices 306, the I/O devices 308, and the network devices 310.

The processing unit 302 may be a standard central processor that performs arithmetic and logical operations, a more specific purpose programmable logic controller ("PLC"), a programmable gate array, or other type of processor known to those skilled in the art and suitable for controlling the operation of the server computer. The processing unit 302 can be a single processing unit or a multiple processing unit that includes more than one processing component. Processing units are generally known, and therefore are not described in further detail herein.

The memory 304 communicates with the processing unit 302 via the system bus 312. The memory 304 can include a single memory component or multiple memory components. In some embodiments, the memory 304 is operatively connected to a memory controller (not shown) that enables communication with the processing unit 302 via the system bus 312. The memory 304 includes an operating system 314 and one or more program modules 316. The operating system 314 can include, but is not limited to, members of the WINDOWS, WINDOWS CE, and/or WINDOWS MOBILE families of operating systems from MICROSOFT CORPORATION, the LINUX family of operating systems, the SYMBIAN family of operating systems from SYMBIAN LIMITED, the BREW family of operating systems from QUALCOMM CORPORATION, the MAC OSX, iOS, and/or families of operating systems from APPLE CORPORATION, the FREEBSD family of operating systems, the SOLARIS family of operating systems from ORACLE CORPORATION, other operating systems, and the like.

The program modules 316 may include various software and/or program modules described herein. The program modules 316 of the server 112 configured like the computer system 300 can include, for example, the virtual machine(s) 114 and the application(s) 115. The program modules 316 of the guardrail policy system 102 configured like the computer system 300 can include, for example, the guardrail policy module 128, the FCM 104, the TDM 106, the RAM 108, or some combination thereof. In some embodiments, multiple implementations of the computer system 300 can be used, wherein each implementation is configured to execute one or more of the program modules 316. The program modules 316 and/or other programs can be embodied in computer-readable media containing instructions that, when executed by the processing unit 302, perform the method 200 described herein. According to embodiments, the program modules 316 may be embodied in hardware, software, firmware, or any combination thereof. The memory 304 also can be configured to store the guardrail policies 110, the confidence score 122, the risk assessment score 124, the server fingerprint data 130, the server traffic data 132, the application type data 134, the cluster data 136, some combination thereof, and/or other data disclosed herein.

By way of example, and not limitation, computer-readable media may include any available computer storage media or communication media that can be accessed by the computer system 300. Communication media includes computer-readable instructions, data structures, program modules, or other data in a modulated data signal such as a carrier wave or other transport mechanism and includes any delivery media. The term "modulated data signal" means a signal that has one or more of its characteristics changed or set in a manner as to encode information in the signal. By way of example, and not limitation, communication media includes wired media such as a wired network or direct-wired connection, and wireless media such as acoustic, RF, infrared and other wireless media. Combinations of the any of the above should also be included within the scope of computer-readable media.

Computer storage media includes volatile and non-volatile, removable and non-removable media implemented in any method or technology for storage of information such as computer-readable instructions, data structures, program modules, or other data. Computer storage media includes, but is not limited to, random access memory ("RAM"), read-only memory ("ROM"), Erasable Programmable ROM ("EPROM"), Electrically Erasable Programmable ROM ("EEPROM"), flash memory or other solid state memory technology, CD-ROM, digital versatile disks ("DVD"), or other optical storage, magnetic cassettes, magnetic tape, magnetic disk storage or other magnetic storage devices, or any other medium which can be used to store the desired information and which can be accessed by the computer system 300. In the claims, the phrase "computer storage medium," "computer-readable storage medium," and variations thereof does not include waves or signals per se and/or communication media, and therefore should be construed as being directed to "non-transitory" media only.

The user interface devices 306 may include one or more devices with which a user accesses the computer system 300. The user interface devices 306 may include, but are not limited to, computers, servers, personal digital assistants, cellular phones, or any suitable computing devices. The I/O devices 308 enable a user to interface with the program modules 316. In one embodiment, the I/O devices 308 are operatively connected to an I/O controller (not shown) that enables communication with the processing unit 302 via the system bus 312. The I/O devices 308 may include one or more input devices, such as, but not limited to, a keyboard, a mouse, or an electronic stylus. Further, the I/O devices 308 may include one or more output devices, such as, but not limited to, a display screen or a printer.

The network devices 310 enable the computer system 300 to communicate with other networks or remote systems via the network(s) 118. Examples of the network devices 310 include, but are not limited to, a modem, a radio frequency ("RF") or infrared ("IR") transceiver, a telephonic interface, a bridge, a router, or a network card. The network 118 may include a wireless network such as, but not limited to, a Wireless Local Area Network ("WLAN") such as a WI-FI network, a Wireless Wide Area Network ("WWAN"), a Wireless Personal Area Network ("WPAN") such as BLUETOOTH, a Wireless Metropolitan Area Network ("WMAN") such a WiMAX network, or a cellular network. Alternatively, the network 118 may be a wired network such as, but not limited to, a Wide Area Network ("WAN") such as the Internet, a Local Area Network ("LAN") such as the Ethernet, a wired Personal Area Network ("PAN"), or a wired Metropolitan Area Network ("MAN").

Figure 4:
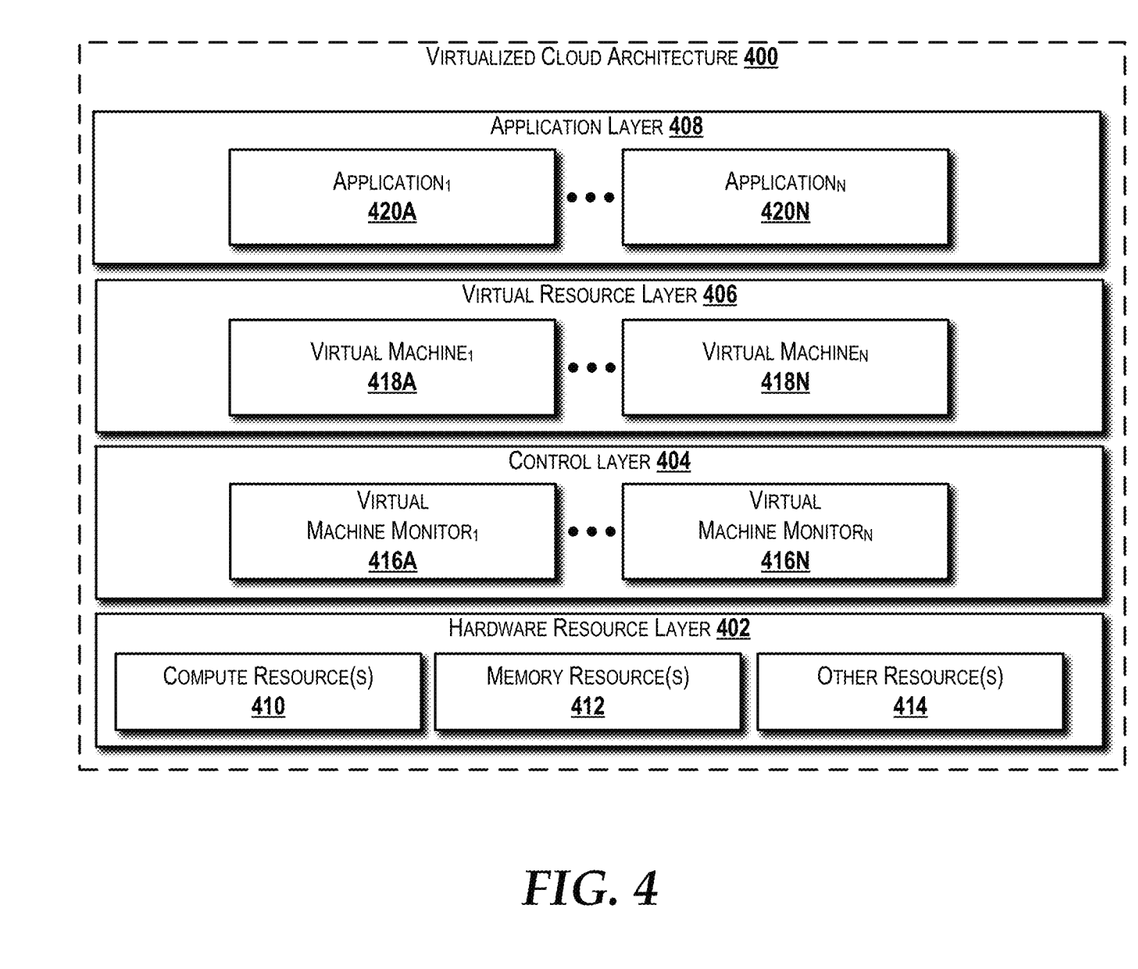
FIG. 4 is a block diagram illustrating an example virtualized cloud architecture capable of implementing aspects of the embodiments presented herein.

Turning now to FIG. 4, a block diagram illustrating an example virtualized cloud architecture 400 and components thereof will be described, according to an exemplary embodiment. The virtualized cloud architecture 400 can be utilized to implement various elements disclosed herein. In some embodiments, the guardrail policy system 102 and/or the server 112 is/are implemented in the virtualized cloud architecture 400.

The virtualized cloud architecture 400 is a shared infrastructure that can support multiple services and network applications. The illustrated virtualized cloud architecture 400 includes a hardware resource layer 402, a control layer 404, a virtual resource layer 406, and an application layer 408 that work together to perform operations as will be described in detail herein.

The hardware resource layer 402 provides hardware resources, which, in the illustrated embodiment, include one or more compute resources 410, one or more memory resources 412, and one or more other resources 414. The compute resource(s) 410 can include one or more hardware components that perform computations to process data, and/or to execute computer-executable instructions of one or more application programs, operating systems, and/or other software. The compute resources 410 can include one or more central processing units ("CPUs") configured with one or more processing cores. The compute resources 410 can include one or more graphics processing unit ("GPU") configured to accelerate operations performed by one or more CPUs, and/or to perform computations to process data, and/or to execute computer-executable instructions of one or more application programs, operating systems, and/or other software that may or may not include instructions particular to graphics computations. In some embodiments, the compute resources 410 can include one or more discrete GPUs. In some other embodiments, the compute resources 410 can include CPU and GPU components that are configured in accordance with a co-processing CPU/GPU computing model, wherein the sequential part of an application executes on the CPU and the computationally-intensive part is accelerated by the GPU. The compute resources 410 can include one or more system-on-chip ("SoC") components along with one or more other components, including, for example, one or more of the memory resources 412, and/or one or more of the other resources 414. In some embodiments, the compute resources 410 can be or can include one or more SNAPDRAGON SoCs, available from QUALCOMM; one or more TEGRA SoCs, available from NVIDIA; one or more HUMMINGBIRD SoCs, available from SAMSUNG; one or more Open Multimedia Application Platform ("OMAP") SoCs, available from TEXAS INSTRUMENTS; one or more customized versions of any of the above SoCs; and/or one or more proprietary SoCs. The compute resources 410 can be or can include one or more hardware components architected in accordance with an advanced reduced instruction set computing ("RISC") machine ("ARM") architecture, available for license from ARM HOLDINGS. Alternatively, the compute resources 410 can be or can include one or more hardware components architected in accordance with an x86 architecture, such an architecture available from INTEL CORPORATION of Mountain View, Calif., and others. Those skilled in the art will appreciate the implementation of the compute resources 410 can utilize various computation architectures, and as such, the compute resources 410 should not be construed as being limited to any particular computation architecture or combination of computation architectures, including those explicitly disclosed herein.

The memory resource(s) 412 can include one or more hardware components that perform storage operations, including temporary or permanent storage operations. In some embodiments, the memory resource(s) 412 include volatile and/or non-volatile memory implemented in any method or technology for storage of information such as computer-readable instructions, data structures, program modules, or other data disclosed herein. Computer storage media includes, but is not limited to, RAM, ROM, EPROM, EEPROM, flash memory or other solid state memory technology, CD-ROM, DVD, or other optical storage, magnetic cassettes, magnetic tape, magnetic disk storage or other magnetic storage devices, or any other medium which can be used to store data and which can be accessed by the compute resources 410.

The other resource(s) 414 can include any other hardware resources that can be utilized by the compute resources(s) 410 and/or the memory resource(s) 412 to perform operations described herein. The other resource(s) 414 can include one or more input and/or output processors (e.g., network interface controller or wireless radio), one or more modems, one or more codec chipset, one or more pipeline processors, one or more fast Fourier transform ("FFT") processors, one or more digital signal processors ("DSPs"), one or more speech synthesizers, and/or the like.

The hardware resources operating within the hardware resource layer 402 can be virtualized by one or more virtual machine monitors ("VMMs") 416A-416N (also known as "hypervisors;" hereinafter "VMMs 416") operating within the control layer 404 to manage one or more virtual resources that reside in the virtual resource layer 406. The VMMs 416 can be or can include software, firmware, and/or hardware that alone or in combination with other software, firmware, and/or hardware, manages one or more virtual resources operating within the virtual resource layer 406.

The virtual resources operating within the virtual resource layer 406 can include abstractions of at least a portion of the compute resources 410, the memory resources 412, the other resources 414, or any combination thereof. These abstractions are referred to herein as virtual machines ("VMs"). In the illustrated embodiment, the virtual resource layer 406 includes VMs 418A-418N (hereinafter "VMs 418"). Each of the VMs 418 can execute one or more applications 420A-420N in the application layer 408.

The server 112 can be implemented on the virtualized cloud architecture 400. In such implementations, the virtual machines 114 can be implemented in the virtual resource layer 406 and can execute the applications 115. The guardrail policy system 102 also can be implemented on the virtualized cloud architecture 400, which can be used to execute the FCM 104, the TDM 106, the RAM 108, and the guardrail policy module 128. The server 112 and the guardrail policy system 102 can be implemented on the same or different virtualized cloud architectures 400.

Figure 5:
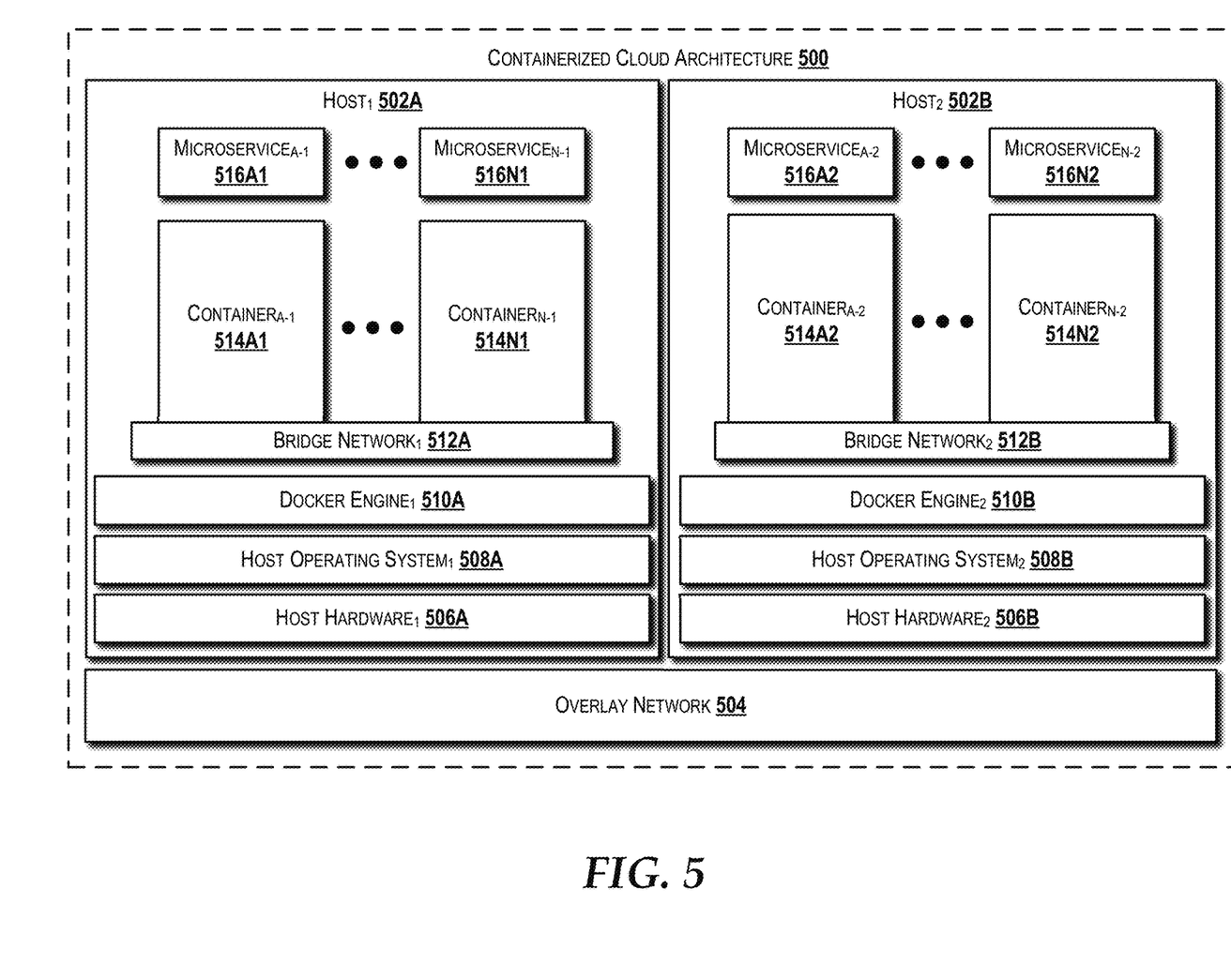
FIG. 5 is a block diagram illustrating an example containerized cloud architecture capable of implementing aspects of the embodiments presented herein.

Turning now to FIG. 5, a block diagram illustrating an exemplary containerized cloud architecture 500 capable of implementing, at least in part, aspects of the concepts and technologies disclosed herein will be described, according to an illustrative embodiment. The containerized cloud architecture 500 can be utilized to implement various elements disclosed herein. In some embodiments, the guardrail policy system 102 and/or the server 112 is/are implemented in the containerized cloud architecture 500.

The illustrated containerized cloud architecture 500 includes a first host ("host$_1$") 502A and a second host ("host$_2$") 502B (at times referred to herein collectively as hosts 502 or individually as host 502) that can communicate via an overlay network 504. Although two hosts 502 are shown, the containerized cloud architecture 500 can support any number of hosts 502. The overlay network 504 can enable communication among hosts 502 in the same cloud network or hosts 502 across different cloud networks. Moreover, the overlay network 504 can enable communication among hosts 502 owned and/or operated by the same or different entities.

The illustrated host$_1$ 502A includes a host hardware$_1$ 506A, a host operating system$_1$ 508A, a DOCKER engine$_1$ 510A, a bridge network$_1$ 512A, container$_{A-1}$ through container$_{N-1}$ 514A1-514N1, and microservice$_{A-1}$ through microservice$_{N-1}$ 516A1-516N1. Similarly, the illustrated host$_2$ 502B includes a host hardware$_2$ 506B, a host operating system$_2$ 508B, a DOCKER engine$_2$ 510B, a bridge network$_2$ 512B, container$_{A-2}$ through container$_{N-2}$ 514A2-514N2, and microservice$_{A-2}$ through microservice$_{N-2}$ 516A2-516N2.

The host hardware$_1$ 506A and the host hardware$_2$ 506B (at times referred to herein collectively or individually as host hardware 506) can be implemented as bare metal hardware such as one or more physical servers. The host hardware 506 alternatively can be implemented using hardware virtualization. In some embodiments, the host hardware 506 can include compute resources, memory resources, and other hardware resources. These resources can be virtualized according to known virtualization techniques. A virtualization cloud architecture 400 is described herein with reference to FIG. 4. Although the containerized cloud architecture 500 and the virtualization cloud architecture 400 are described separately, these architectures can be combined to provide a hybrid containerized/virtualized cloud architecture. Those skilled in the art will appreciate that the disclosed cloud architectures are simplified for ease of explanation and can be altered as needed for any given implementation without departing from the scope of the concepts and technologies disclosed herein. As such, the containerized cloud architecture 500 and the virtualized cloud architecture 400 should not be construed as being limiting in any way.

Compute resources can include one or more hardware components that perform computations to process data and/or to execute computer-executable instructions. For example, the compute resources can execute instructions of the host operating system$_1$ 508A and the host operating system$_2$ 508B (at times referred to herein collectively as host operating systems 508 or individually as host operating system 508), the containers 514A1-514N1 and the containers 514A2-514N2 (at times referred to herein collectively as containers 514 or individually as container 514), and the microservices 516A1-516N1 and the microservices 516A1-516N1 (at times referred to herein collectively as microservices 516 or individually as microservice 516).

The compute resources of the host hardware 506 can include one or more central processing units ("CPUs") configured with one or more processing cores. The compute resources can include one or more graphics processing unit ("GPU") configured to accelerate operations performed by one or more CPUs, and/or to perform computations to process data, and/or to execute computer-executable instructions of one or more application programs, operating systems, and/or other software that may or may not include instructions particular to graphics computations. In some embodiments, the compute resources can include one or more discrete GPUs. In some other embodiments, the compute resources can include CPU and GPU components that are configured in accordance with a co-processing CPU/GPU computing model, wherein the sequential part of an application executes on the CPU and the computationally-intensive part is accelerated by the GPU. The compute resources can include one or more system-on-chip ("SoC") components along with one or more other components, including, for example, one or more memory resources, and/or one or more other resources. In some embodiments, the compute resources can be or can include one or more SNAPDRAGON SoCs, available from QUALCOMM; one or more TEGRA SoCs, available from NVIDIA; one or more HUMMINGBIRD SoCs, available from SAMSUNG; one or more Open Multimedia Application Platform ("OMAP") SoCs, available from TEXAS INSTRUMENTS;

one or more customized versions of any of the above SoCs; and/or one or more proprietary SoCs. The compute resources can be or can include one or more hardware components architected in accordance with an advanced reduced instruction set computing ("RISC") ("ARM") architecture, available for license from ARM HOLDINGS. Alternatively, the compute resources can be or can include one or more hardware components architected in accordance with an x86 architecture, such an architecture available from INTEL CORPORATION, and others. Those skilled in the art will appreciate the implementation of the compute resources can utilize various computation architectures, and as such, the compute resources should not be construed as being limited to any particular computation architecture or combination of computation architectures, including those explicitly disclosed herein.

The memory resources of the host hardware 506 can include one or more hardware components that perform storage operations, including temporary or permanent storage operations. In some embodiments, the memory resource(s) include volatile and/or non-volatile memory implemented in any method or technology for storage of information such as computer-readable instructions, data structures, program modules, or other data disclosed herein. Computer storage media includes, but is not limited to, RAM, ROM, EPROM, EEPROM, flash memory or other solid state memory technology, CD-ROM, DVD, or other optical storage, magnetic cassettes, magnetic tape, magnetic disk storage or other magnetic storage devices, or any other medium which can be used to store data and which can be accessed by the compute resources.

The other resource(s) of the host hardware 506 can include any other hardware resources that can be utilized by the compute resources(s) and/or the memory resource(s) to perform operations described herein. The other resource(s) can include one or more input and/or output processors (e.g., network interface controller or wireless radio), one or more modems, one or more codec chipset, one or more pipeline processors, one or more fast Fourier transform ("FFT") processors, one or more digital signal processors ("DSPs"), one or more speech synthesizers, and/or the like.

The host operating systems 508 can be proprietary, open source, or closed source. In some embodiments, the host operating systems 508 can be or can include one or more container operating systems designed specifically to host containers such as the containers 514. For example, the host operating systems 508 can be or can include FEDORA COREOS (available from RED HAT, INC), RANCHEROS (available from RANCHER), and/or BOTTLEROCKET (available from Amazon Web Services). In some embodiments, the host operating systems 508 can be or can include one or more members of the WINDOWS family of operating systems from MICROSOFT CORPORATION (e.g., WINDOWS SERVER), the LINUX family of operating systems (e.g., CENTOS, DEBIAN, FEDORA, ORACLE LINUX, RHEL, SUSE, and UBUNTU), the SOLARIS family of operating systems from ORACLE CORPORATION, other operating systems, and the like.

The containerized cloud architecture 500 can be implemented utilizing any containerization technologies. Presently, open-source container technologies, such as those available from DOCKER, INC., are the most widely used, and it appears will continue to be for the foreseeable future. For this reason, the containerized cloud architecture 500 is described herein using DOCKER container technologies available from DOCKER, INC., such as the DOCKER engines 510. Those skilled in the art will appreciate that other container technologies, such as KUBERNETES may also be applicable to implementing the concepts and technologies disclosed herein, and as such, the containerized cloud architecture 500 is not limited to DOCKER container technologies. Moreover, although open-source container technologies are most widely used, the concepts and technologies disclosed here may be implemented using proprietary technologies or closed source technologies.

The DOCKER engines 510 are based on open source containerization technologies available from DOCKER, INC. The DOCKER engines 510 enable users (not shown) to build and containerize applications. The full breadth of functionality provided by the DOCKER engines 510 and associated components in the DOCKER architecture are beyond the scope of the present disclosure. As such, the primary functions of the DOCKER engines 510 will be described herein in brief, but this description should not be construed as limiting the functionality of the DOCKER engines 510 or any part of the associated DOCKER architecture. Instead, those skilled in the art will understand the implementation of the DOCKER engines 510 and other components of the DOCKER architecture to facilitate building and containerizing applications within the containerized cloud architecture 500.

The DOCKER engine 510 functions as a client-server application executed by the host operating system 508. The DOCKER engine 510 provides a server with a daemon process along with application programming interfaces ("APIs") that specify interfaces that applications can use to communicate with and instruct the daemon to perform operations. The DOCKER engine 510 also provides a command line interface ("CLI") that uses the APIs to control and interact with the daemon through scripting and/or CLI commands. The daemon can create and manage objects such as images, containers, networks, and volumes. Although a single DOCKER engine 510 is illustrated in each of the hosts 502, multiple DOCKER engines 510 are contemplated. The DOCKER engine(s) 510 can be run in swarm mode.

The bridge networks 512 enable the containers 514 connected to the same bridge network to communicate. For example, the bridge network$_1$ 512A enables communication among the containers 514A1-514N1, and the bridge network$_2$ 512B enables communication among the containers 514A2-514N2. In some embodiments, the bridge networks 512 are software network bridges implemented via the DOCKER bridge driver. The DOCKER bridge driver enables default and user-defined network bridges.

The containers 514 are runtime instances of images. The containers 514 are described herein specifically as DOCKER containers, although other containerization technologies are contemplated as noted above. Each container 514 can include an image, an execution environment, and a standard set of instructions.

The microservices 516 are applications that provide a single function. In some embodiments, each of the microservices 516 is provided by one of the containers 514, although each of the containers 514 may contain multiple microservices 516. For example, the microservices 516 can include, but are not limited to, server, database, and other executable applications to be run in an execution environment provided by a container 514. The microservices 516 can provide any type of functionality, and therefore all the possible functions cannot be listed herein. Those skilled in the art will appreciate the use of the microservices 516 along with the containers 514 to improve many aspects of the containerized cloud architecture 500, such as reliability, security, agility, and efficiency, for example.

The server 112 can be implemented on the containerized cloud architecture 500. The guardrail policy system 102 also can be implemented on containerized cloud architecture 500. The server 112 and the guardrail policy system 102 can be implemented on the same or different containerized cloud architectures 500.

Figure 6:
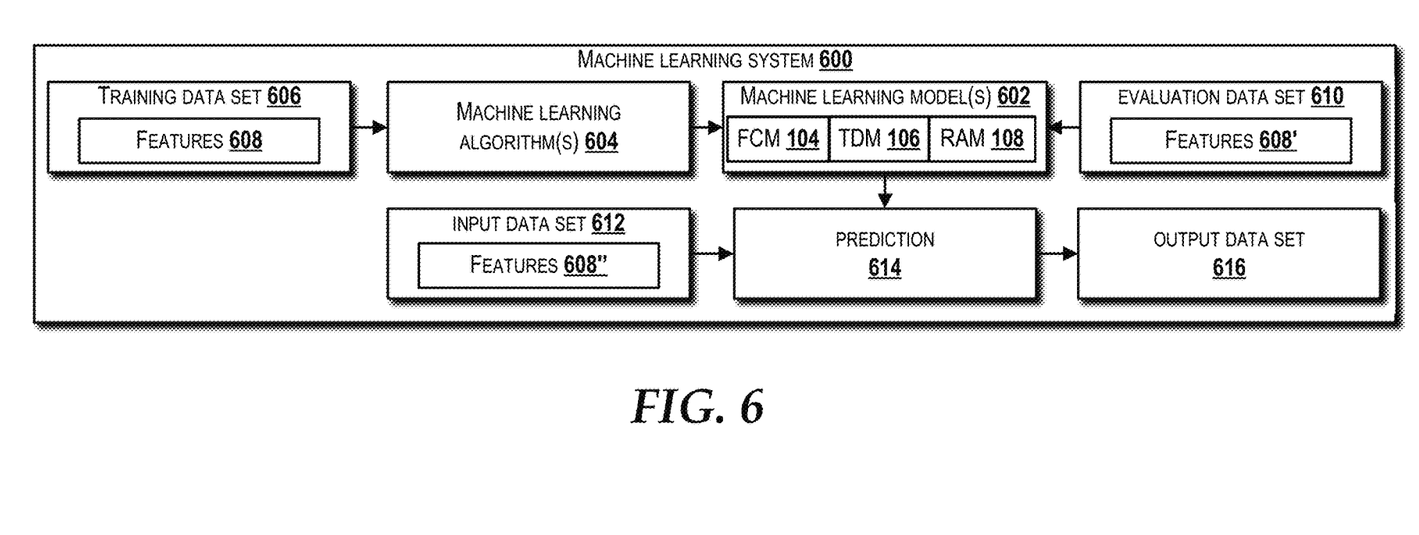
FIG. 6 is a block diagram illustrating an example machine learning system capable of implementing aspects of the embodiments presented herein.

Turning now to FIG. 6, a machine learning system 600 capable of implementing aspects of the embodiments disclosed herein will be described. The machine learning system 600 can be used to train the FCM 104, the TDM 106, and the RAM 108. Accordingly, the guardrail policy system 102 can include the machine learning system 600 or can be in communication with the machine learning system 600.

The illustrated machine learning system 600 includes one or more machine learning models 602, such as the FCM 104, the TDM 106, and the RAM 108. The machine learning models 602 can include, unsupervised, supervised, and/or semi-supervised learning models. The machine learning model(s) 602 can be created by the machine learning system 600 based upon one or more machine learning algorithms 604. The machine learning algorithm(s) 604 can be any existing, well-known algorithm, any proprietary algorithms, or any future machine learning algorithm. Some example machine learning algorithms 604 include, but are not limited to, neural networks, gradient descent, linear regression, logistic regression, linear discriminant analysis, classification tree, regression tree, Naive Bayes, K-nearest neighbor, learning vector quantization, support vector machines, and the like. Classification and regression algorithms might find particular applicability to the concepts and technologies disclosed herein. Those skilled in the art will appreciate the applicability of various machine learning algorithms 604 based upon the problem(s) to be solved by machine learning via the machine learning system 600.

The machine learning system 600 can control the creation of the machine learning models 602 via one or more training parameters. In some embodiments, the training parameters are selected modelers at the direction of an enterprise, for example. Alternatively, in some embodiments, the training parameters are automatically selected based upon data provided in one or more training data sets 606. The training parameters can include, for example, a learning rate, a model size, a number of training passes, data shuffling, regularization, and/or other training parameters known to those skilled in the art. The training data in the training data sets 606 can include historical data obtained from the server 112. The historical data can include the server fingerprint data 130, the server traffic data 132, and the application type data 134 obtained in the past from the server 112.

The learning rate is a training parameter defined by a constant value. The learning rate affects the speed at which the machine learning algorithm 604 converges to the optimal weights. The machine learning algorithm 604 can update the weights for every data example included in the training data set 606. The size of an update is controlled by the learning rate. A learning rate that is too high might prevent the machine learning algorithm 604 from converging to the optimal weights. A learning rate that is too low might result in the machine learning algorithm 604 requiring multiple training passes to converge to the optimal weights.

The model size is regulated by the number of input features ("features") 608 in the training data set 606. A greater the number of features 608 yields a greater number of possible patterns that can be determined from the training data set 606. The model size should be selected to balance the resources (e.g., compute, memory, storage, etc.) needed for training and the predictive power of the resultant machine learning model 602.

The number of training passes indicates the number of training passes that the machine learning algorithm 604 makes over the training data set 606 during the training process. The number of training passes can be adjusted based, for example, on the size of the training data set 606, with larger training data sets being exposed to fewer training passes in consideration of time and/or resource utilization. The effectiveness of the resultant machine learning model 602 can be increased by multiple training passes.

Data shuffling is a training parameter designed to prevent the machine learning algorithm 604 from reaching false optimal weights due to the order in which data contained in the training data set 606 is processed. For example, data provided in rows and columns might be analyzed first row, second row, third row, etc., and thus an optimal weight might be obtained well before a full range of data has been considered. By data shuffling, the data contained in the training data set 606 can be analyzed more thoroughly and mitigate bias in the resultant machine learning model 602.

Regularization is a training parameter that helps to prevent the machine learning model 602 from memorizing training data from the training data set 606. In other words, the machine learning model 602 fits the training data set 606, but the predictive performance of the machine learning model 602 is not acceptable. Regularization helps the machine learning system 600 avoid this overfitting/memorization problem by adjusting extreme weight values of the features 608. For example, a feature that has a small weight value relative to the weight values of the other features in the training data set 606 can be adjusted to zero.

The machine learning system 600 can determine model accuracy after training by using one or more evaluation data sets 610 containing the same features 608' as the features 608 in the training data set 606. This also prevents the machine learning model 602 from simply memorizing the data contained in the training data set 606. The number of evaluation passes made by the machine learning system 600 can be regulated by a target model accuracy that, when reached, ends the evaluation process and the machine learning model 602 is considered ready for deployment.

After deployment, the machine learning model 602 can perform a prediction operation ("prediction") 614 with an input data set 612 having the same features 608" as the features 608 in the training data set 606 and the features 608' of the evaluation data set 610. The results of the prediction 614 are included in an output data set 616 consisting of predicted data. The machine learning model 602 can perform other operations, such as regression, classification, and others. As such, the example illustrated in FIG. 6 should not be construed as being limiting in any way.

Figure 7:
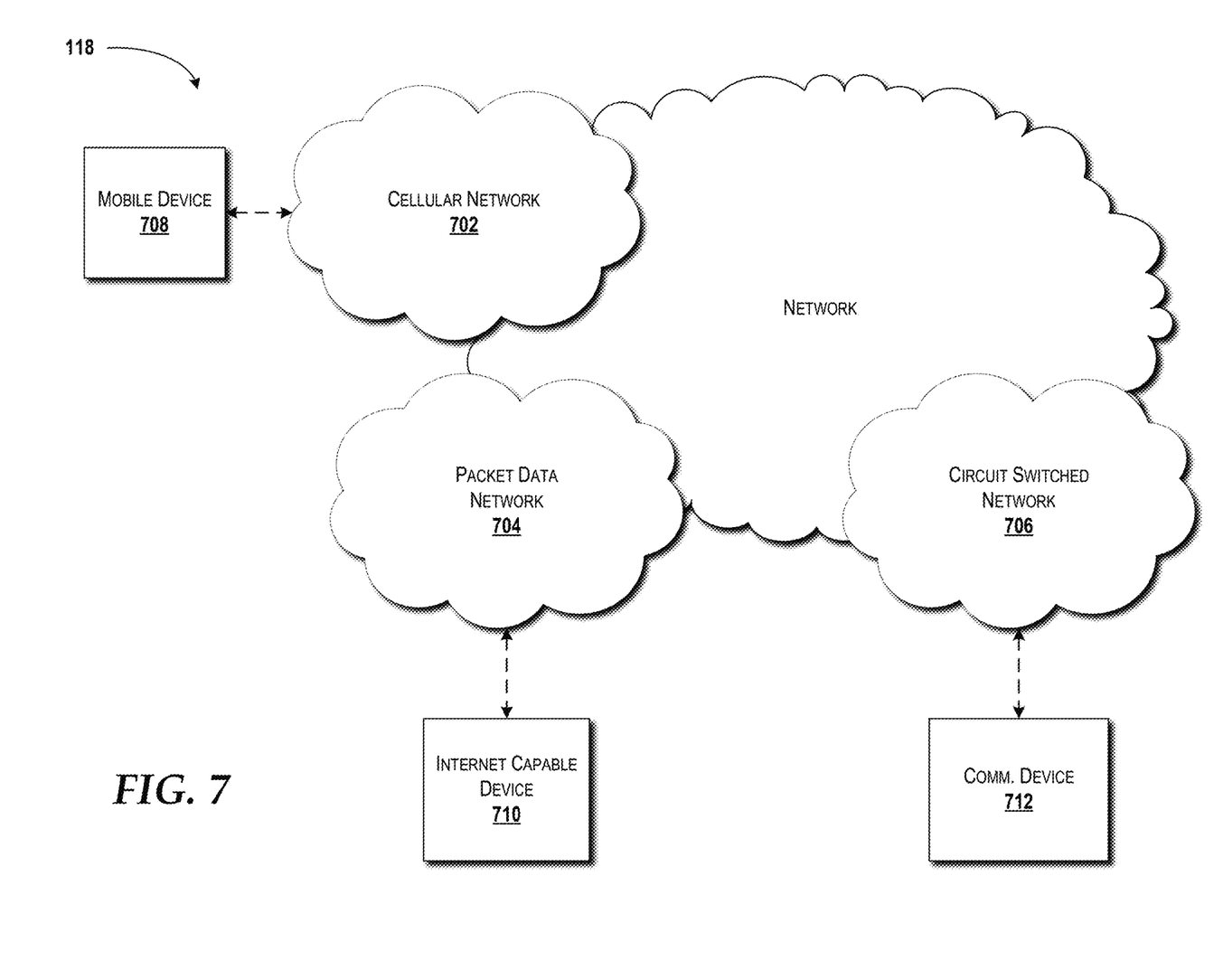
FIG. 7 is a diagram illustrating a network, according to an illustrative embodiment.

Turning now to FIG. 7, details of a network 118 are illustrated, according to an illustrative embodiment. The network 118 includes a cellular network 702, a packet data network 704, and a circuit switched network 706. The cellular network 702 can include various components such as, but not limited to, base transceiver stations ("BTSs"), Node-Bs or e-Node-Bs, base station controllers ("BSCs"), radio network controllers ("RNCs"), mobile switching centers ("MSCs"), mobility management entities ("MMEs"), short message service centers ("SMSCs"), multimedia messaging service centers ("MMSCs"), home location registers ("HLRs"), home subscriber servers ("HSSs"), visitor location registers ("VLRs"), charging platforms, billing platforms, voicemail platforms, GPRS core network components, location service nodes, and the like. The cellular network 702 also includes radios and nodes for receiving and transmitting voice, data, and combinations thereof to and from radio transceivers, networks, the packet data network 704, and the circuit switched network 706.

A mobile communications device 708, such as, for example, a cellular telephone, a user equipment, a mobile terminal, a PDA, a laptop computer, a handheld computer, and combinations thereof, can be operatively connected to the cellular network 702.

The cellular network 702 can be configured as a GSM) network and can provide data communications via GPRS and/or EDGE. Additionally, or alternatively, the cellular network 702 can be configured as a 3G Universal Mobile Telecommunications System ("UMTS") network and can provide data communications via the HSPA protocol family, for example, HSDPA, EUL, and HSPA+. The cellular network 702 also is compatible with 4G mobile communications standards such as LTE, 5G mobile communications standards, or the like, as well as evolved and future mobile standards.

The packet data network 704 includes various systems, devices, servers, computers, databases, and other devices in communication with one another, as is generally known. In some embodiments, the packet data network 704 is or includes one or more WI-FI networks, each of which can include one or more WI-FI access points, routers, switches, and other WI-FI network components. The packet data network 704 devices are accessible via one or more network links. The servers often store various files that are provided to a requesting device such as, for example, a computer, a terminal, a smartphone, or the like. Typically, the requesting device includes software for executing a web page in a format readable by the browser or other software. Other files and/or data may be accessible via "links" in the retrieved files, as is generally known. In some embodiments, the packet data network 704 includes or is in communication with the Internet. The circuit switched network 706 includes various hardware and software for providing circuit switched communications. The circuit switched network 706 may include, or may be, what is often referred to as a plain old telephone system ("POTS"). The functionality of a circuit switched network 706 or other circuit-switched network are generally known and will not be described herein in detail.

The illustrated cellular network 702 is shown in communication with the packet data network 704 and a circuit switched network 706, though it should be appreciated that this is not necessarily the case. One or more Internet-capable devices 712 such as a laptop, a portable device, or another suitable device, can communicate with one or more cellular networks 702, and devices connected thereto, through the packet data network 704. It also should be appreciated that the Internet-capable device 710 can communicate with the packet data network 704 through the circuit switched network 706, the cellular network 702, and/or via other networks (not illustrated).

As illustrated, a communications device 712, for example, a telephone, facsimile machine, modem, computer, or the like, can be in communication with the circuit switched network 706, and therethrough to the packet data network 704 and/or the cellular network 702. It should be appreciated that the communications device 712 can be an Internet-capable device, and can be substantially similar to the Internet-capable device 710.

Based on the foregoing, it should be appreciated that concepts and technologies directed to machine learning-based deployment of guardrail policies have been disclosed herein. Although the subject matter presented herein has been described in language specific to computer structural features, methodological and transformative acts, specific computing machinery, and computer-readable media, it is to be understood that the concepts and technologies disclosed herein are not necessarily limited to the specific features, acts, or media described herein. Rather, the specific features, acts and mediums are disclosed as example forms of implementing the concepts and technologies disclosed herein.

The subject matter described above is provided by way of illustration only and should not be construed as limiting. Various modifications and changes may be made to the subject matter described herein without following the example embodiments and applications illustrated and described, and without departing from the true spirit and scope of the embodiments of the concepts and technologies disclosed herein.

The invention claimed is:

1. A method comprising:
   receiving, by a guardrail policy system comprising a processor, a guardrail policy request that specifies a guardrail policy to assess for deployment on a server, wherein the server comprises a plurality of ports, and wherein the guardrail policy is to be used to protect at least a specific port of the plurality of ports;
   acquiring, by the guardrail policy system, server fingerprint data, server traffic data, and application type data associated with the server;
   executing, by the guardrail policy system, a fingerprint clustering machine learning model using the server fingerprint data to generate cluster data, wherein the cluster data identifies a virtual machine cluster comprising a plurality of virtual machines executed by the server;
   executing, by the guardrail policy system, a traffic discovery machine learning model using the server traffic data and the cluster data to generate a confidence score indicative of whether deployment of the guardrail policy on the server would have an adverse impact on the server;
   executing, by the guardrail policy system, a risk assessment machine learning model using the application type data to generate a risk assessment score;
   evaluating, by the guardrail policy system, the confidence score and the risk assessment score; and
   determining, by the guardrail policy system, based upon evaluating the confidence score and the risk assessment score, whether the guardrail policy should be deployed on the server.

2. The method of claim 1, wherein the server fingerprint data identifies the virtual machine cluster based upon canonical information from each of the plurality of virtual machines.

3. The method of claim 1, further comprising training, by a machine learning system, the fingerprint clustering machine learning model, the traffic discovery machine learning model, and the risk assessment machine learning model.

4. The method of claim 3, wherein training, by the machine learning system, the traffic discovery machine learning model comprises training, by the machine learning system, a unique instance of the traffic discovery machine learning model specifically for the virtual machine cluster.

5. The method of claim 1, wherein, as the confidence score approaches one, the traffic discovery machine learning model is more confident that the guardrail policy will not have the adverse impact on the server.

6. The method of claim 5, wherein determining, by the guardrail policy system, based upon evaluating the confidence score and the risk assessment score, whether the guardrail policy should be deployed on the server comprises determining, by the guardrail policy system, that the guardrail policy should be deployed on the server.

7. The method of claim 1, wherein, as the confidence score approaches zero, the traffic discovery machine learning model is less confident that the guardrail policy will not have the adverse impact on the server.

8. The method of claim 7, wherein determining, by the guardrail policy system, based upon evaluating the confidence score and the risk assessment score, whether the guardrail policy should be deployed on the server comprises determining, by the guardrail policy system, that the guardrail policy should not be deployed on the server.

9. A guardrail policy system comprising:
a processor; and
a memory comprising computer-executable instructions that, when executed by the processor, cause the processor to perform operations comprising
receiving a guardrail policy request that specifies a guardrail policy to assess for deployment on a server, wherein the server comprises a plurality of ports, and wherein the guardrail policy is to be used to protect at least a specific port of the plurality of ports,
acquiring server fingerprint data, server traffic data, and application type data associated with the server,
executing a fingerprint clustering machine learning model using the server fingerprint data to generate cluster data, wherein the cluster data identifies a virtual machine cluster comprising a plurality of virtual machines executed by the server,
executing a traffic discovery machine learning model using the server traffic data and the cluster data to generate a confidence score indicative of whether deployment of the guardrail policy on the server would have an adverse impact on the server,
executing a risk assessment machine learning model using the application type data to generate a risk assessment score,
evaluating the confidence score and the risk assessment score, and
determining, based upon evaluating the confidence score and the risk assessment score, whether the guardrail policy should be deployed on the server.

10. The guardrail policy system of claim 9, wherein the server fingerprint data identifies the virtual machine cluster based upon canonical information from each of the plurality of virtual machines.

11. The guardrail policy system of claim 9, wherein, as the confidence score approaches one, the traffic discovery machine learning model is more confident that the guardrail policy will not have the adverse impact on the server.

12. The guardrail policy system of claim 11, wherein determining, based upon evaluating the confidence score and the risk assessment score, whether the guardrail policy should be deployed on the server comprises determining that the guardrail policy should be deployed on the server.

13. The guardrail policy system of claim 9, wherein, as the confidence score approaches zero, the traffic discovery machine learning model is less confident that the guardrail policy will not have the adverse impact on the server.

14. The guardrail policy system of claim 13, wherein determining, based upon evaluating the confidence score and the risk assessment score, whether the guardrail policy should be deployed on the server comprises determining that the guardrail policy should not be deployed on the server.

15. A computer-readable storage medium comprising computer-executable instructions that, when executed by a processor, cause the processor to perform operations comprising:
receiving a guardrail policy request that specifies a guardrail policy to assess for deployment on a server, wherein the server comprises a plurality of ports, and wherein the guardrail policy is to be used to protect at least a specific port of the plurality of ports;
acquiring server fingerprint data, server traffic data, and application type data associated with the server;
executing a fingerprint clustering machine learning model using the server fingerprint data to generate cluster data, wherein the cluster data identifies a virtual machine cluster comprising a plurality of virtual machines executed by the server;
executing a traffic discovery machine learning model using the server traffic data and the cluster data to generate a confidence score indicative of whether deployment of the guardrail policy on the server would have an adverse impact on the server;
executing a risk assessment machine learning model using the application type data to generate a risk assessment score;
evaluating the confidence score and the risk assessment score; and
determining, based upon evaluating the confidence score and the risk assessment score, whether the guardrail policy should be deployed on the server.

16. The computer-readable storage medium of claim 15, wherein the server fingerprint data identifies the virtual machine cluster based upon canonical information from each of the plurality of virtual machines.

17. The computer-readable storage medium of claim 15, wherein, as the confidence score approaches one, the traffic discovery machine learning model is more confident that the guardrail policy will not have the adverse impact on the server.

18. The computer-readable storage medium of claim 17, wherein determining, based upon evaluating the confidence score and the risk assessment score, whether the guardrail policy should be deployed on the server comprises determining that the guardrail policy should be deployed on the server.

19. The computer-readable storage medium of claim 15, wherein, as the confidence score approaches zero, the traffic discovery machine learning model is less confident that the guardrail policy will not have the adverse impact on the server.

20. The computer-readable storage medium of claim 19, wherein determining, based upon evaluating the confidence score and the risk assessment score, whether the guardrail policy should be deployed on the server comprises determining that the guardrail policy should not be deployed on the server.

* * * * *